(12) United States Patent
Heiskanen et al.

(10) Patent No.: US 11,077,648 B2
(45) Date of Patent: Aug. 3, 2021

(54) BOARD WITH IMPROVED COMPRESSION STRENGTH

(71) Applicant: Stora Enso OYJ, Helsinki (FI)

(72) Inventors: Isto Heiskanen, Imatra (FI); Seppo Lampainen, Lahti (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 38 days.

(21) Appl. No.: 16/087,281

(22) PCT Filed: Mar. 21, 2017

(86) PCT No.: PCT/IB2017/051623
§ 371 (c)(1),
(2) Date: Sep. 21, 2018

(87) PCT Pub. No.: WO2017/163176
PCT Pub. Date: Sep. 28, 2017

(65) Prior Publication Data
US 2019/0047273 A1 Feb. 14, 2019

(30) Foreign Application Priority Data

Mar. 23, 2016 (SE) ........................................ 1650390

(51) Int. Cl.
| | |
|---|---|
| *B32B 29/08* | (2006.01) |
| *D21H 27/10* | (2006.01) |
| *D21H 27/38* | (2006.01) |
| *D21H 27/40* | (2006.01) |
| *D21H 11/18* | (2006.01) |
| *D21H 17/25* | (2006.01) |
| *D21H 21/16* | (2006.01) |
| *D21H 21/18* | (2006.01) |
| *D21H 17/16* | (2006.01) |
| *D21H 17/17* | (2006.01) |
| *D21H 17/62* | (2006.01) |
| *B65D 65/40* | (2006.01) |
| *B32B 29/00* | (2006.01) |

(52) U.S. Cl.
CPC ............ *B32B 29/08* (2013.01); *B32B 29/005* (2013.01); *B65D 65/403* (2013.01); *D21H 11/18* (2013.01); *D21H 17/16* (2013.01); *D21H 17/17* (2013.01); *D21H 17/25* (2013.01); *D21H 17/62* (2013.01); *D21H 21/16* (2013.01); *D21H 21/18* (2013.01); *D21H 27/10* (2013.01); *D21H 27/38* (2013.01); *D21H 27/40* (2013.01); *B32B 2262/062* (2013.01); *B32B 2262/14* (2013.01); *B32B 2307/50* (2013.01); *B32B 2307/54* (2013.01); *B32B 2307/548* (2013.01); *B32B 2307/718* (2013.01); *B32B 2307/7246* (2013.01); *B32B 2307/73* (2013.01); *B32B 2307/732* (2013.01); *B32B 2439/62* (2013.01)

(58) Field of Classification Search
CPC ........ D21H 11/18; D21H 27/10; D21H 17/17; D21H 21/16; D21H 27/40; D21H 11/04; D21H 11/14; D21H 17/25; D21H 27/38; D21H 11/02; D21H 17/16; D21H 17/675; D21H 21/10; D21H 21/18; D21H 27/30; D21H 27/32; D21H 17/22; D21H 11/00; D21H 11/08; D21H 11/16; D21H 17/09; B32B 29/005; B32B 2307/718; B32B 29/08; B32B 2262/062; B32B 2262/14; B32B 2307/50; B32B 2307/54; B32B 2307/73; B32B 2250/26; B32B 2250/02; B32B 2250/03; B32B 29/002; B32B 3/26; B32B 3/28; B32B 5/26; B32B 7/02; B32B 7/12; B65D 65/403
See application file for complete search history.

(56) References Cited

U.S. PATENT DOCUMENTS

| | | |
|---|---|---|
| 3,875,680 A | 4/1975 | Back et al. |
| 10,214,859 B2 * | 2/2019 | Svending ............... D21H 19/52 |
| 10,364,533 B2 * | 7/2019 | Heiskanen ............. D21H 27/30 |
| 2013/0133848 A1 | 5/2013 | Heijnesson-Hultén et al. |
| 2013/0180680 A1 | 7/2013 | Axrup et al. |

(Continued)

FOREIGN PATENT DOCUMENTS

| | | | |
|---|---|---|---|
| CA | 3016377 A1 * | 9/2017 | ............. D21H 17/16 |
| CL | 199901863 | 5/2000 | |

(Continued)

OTHER PUBLICATIONS

González, Israel, et al. "Nanofibrillated Cellulose as Paper Additive in Eucalyptus Pulps." BioResources, vol. 7, No. 4, 2012, doi:10.15376/biores.7.4.5167-5180.

(Continued)

*Primary Examiner* — Jose A Fortuna
(74) *Attorney, Agent, or Firm* — Greer, Burns & Crain, Ltd.

(57) ABSTRACT

A corrugated fiberboard comprising cellulosic fibers, wherein said corrugated fiberboard has at least one of a geometrical tensile index in the range of from 32 to 65 Nm/g, a fracture toughness index in the range of from 4 to 24 Jm/kg, and a ring crush index in the range of from 5 to 10 Nm/g5 measured at relative humidity of 85% RH; wherein the cellulosic fibers comprises a mixture of less refined fibers having a Schopper-Riegler (SR) value in the range of 15 to 28 and microfibrillated cellulose fibers, wherein mixture comprises said microfibrillated cellulose in a range of from 1% to 5% by weight of the dry content of the cellulosic fibers.

9 Claims, 1 Drawing Sheet

(56) References Cited

U.S. PATENT DOCUMENTS

| | | | |
|---|---|---|---|
| 2013/0313384 A1 | 11/2013 | Nakatani | |
| 2015/0096700 A1* | 4/2015 | Heiskanen | D21H 11/02 |
| | | | 162/174 |
| 2015/0114581 A1* | 4/2015 | Kinnunen | B32B 7/02 |
| | | | 162/125 |
| 2016/0032530 A1 | 2/2016 | Virtanen | |
| 2017/0284030 A1* | 10/2017 | Svending | D21H 11/04 |
| 2017/0328003 A1* | 11/2017 | Retsina | D21H 11/02 |
| 2018/0266054 A1* | 9/2018 | Henaff | D21H 11/04 |
| 2019/0047273 A1* | 2/2019 | Heiskanen | D21H 17/25 |
| 2019/0127920 A1* | 5/2019 | Svending | D21H 21/10 |
| 2020/0048839 A1* | 2/2020 | Oishi | D21H 11/20 |
| 2020/0056334 A1* | 2/2020 | Heiskanen | D21C 9/00 |
| 2020/0109516 A1* | 4/2020 | Retsina | D21H 11/16 |
| 2020/0248042 A1* | 8/2020 | Holtan | C08J 3/005 |
| 2020/0270428 A1* | 8/2020 | Holtan | C09J 103/02 |

FOREIGN PATENT DOCUMENTS

| | | | | |
|---|---|---|---|---|
| EP | 1936032 A1 * | 6/2008 | | D21H 11/18 |
| EP | 2947203 | 11/2015 | | |
| RU | 121512 U1 | 10/2012 | | |
| RU | 2014104162 A | 8/2015 | | |
| WO | 199715440 A1 | 5/1997 | | |
| WO | 9841392 | 9/1998 | | |
| WO | 0014333 | 3/2000 | | |
| WO | 200165010 A1 | 9/2001 | | |
| WO | 2008076056 | 6/2008 | | |
| WO | 2012039668 | 3/2012 | | |
| WO | 2012066308 | 5/2012 | | |
| WO | WO-2017163176 A1 * | 9/2017 | | B32B 29/08 |

OTHER PUBLICATIONS

Hietala, Maiju, et al. "Fluting Medium Strengthened by Periodate-Chlorite Oxidized Nanofibrillated Celluloses." Cellulose, vol. 23, No. 1, 2016, pp. 427-437., doi:10.1007/s10570-015-0801-1.

International Searching Authority, Written Opinion of the International Searching Authority, PCT/IB2017/051623, dated Sep. 28, 2017.

International Searching Authority, International Search Report, PCT/IB2017/051623, dated Sep. 28, 2017.

Hietala, M. et al., "Fluting Medium Strengthened by Periodate-Chlorite Oxidized Nanofibrillated Celluloses," Cellulose, 2016, vol. 23, pp. 427-437.

Gonzalez, I. et al., "Nanofibrillated Cellulose as Paper Additive in Eurcalyptus Pulps," Bioresources, 2012, vol. 7, pp. 5167-5180.

Taipele, T. et al., "Effect of Microfibrillated Cellulose and Fines on the Drainage of Kraft Pulp Suspension and Paper Strength," Cellulose, 2010, vol. 17, pp. 1005-1020.

Ahola, S. et al., "Cellulose Nanofibrils-Adsorption with Poly(amideamine) Epichlorohydrin Studied by QCM-D and Application as a Paper Strength Additive," Cellulose, 2008, vol. 15, pp. 303-314.

Parker, M.E. et al., "Moisture Sorption Isotherms for Paper and Paperboard in Food Chain Conditions," Packaging Technology and Science, 2006, No. 19, pp. 193-209.

Chinga-Carrasco, G., "Cellulose Fibres, Nanofibrils and Microfibrils: The Morphological Sequence of MFC Components from a Plant Physiology and Fibre Technology Point of View," Nanoscale Research Letters 2011.

Fengel, D., "Ultrastructural Behavior of Cell Wall Polysaccharides," Tappi J., Mar. 1970, vol. 53, No. 3.

* cited by examiner

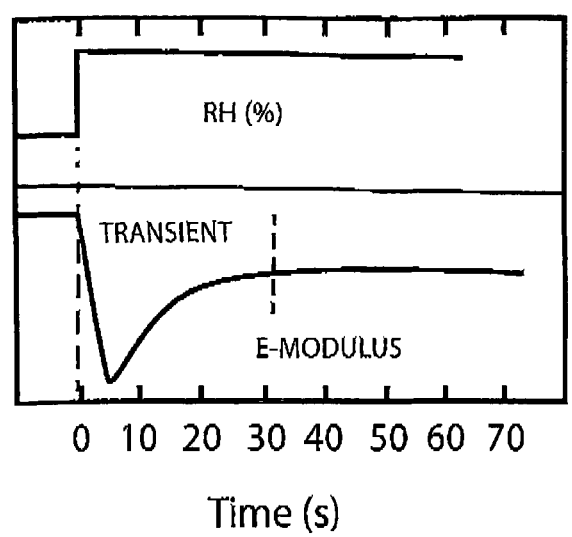

BOARD WITH IMPROVED COMPRESSION STRENGTH

This application is a U.S. National Phase under 35 U.S.C. § 371 of International Application No. PCT/IB2017/051623, filed Mar. 21, 2017, which claims priority under 35 U.S.C. §§ 119 and 365 to Swedish Application No. 1650390-6, filed Mar. 23, 2016.

TECHNICAL FIELD

The present document relates to a board having improved compression strength at a high relative humidity. More particularly, the present disclosure relates to a corrugated fiberboard having improved compression strength and improved compression creep, in particular when subjected to high cyclic moisture humidity variations.

BACKGROUND

Boxes made from board and corrugated fiberboard, produced from fluting and/or liner, are commonly used in demanding conditions and environments in which the moisture content in air changes both from low to high and also at various speeds. In addition to the moisture changes, the temperature may also shift from very low to quite high. These changes all affect the compression strength and dimensional stability of the board or corrugated fiberboard.

The moisture that enters the board through diffusion in high humidity environments may cause so called creeping when the box is under load or under compression conditions, and eventually it will lead to failure or collapse of the box, which of course is undesirable. This effect will be even more severe if going through a moisture cycle, for instance low-high-low moisture, at constant or various temperatures. This can be seen in FIG. 1 where the E-modulus of a conventional board shows a peak quite soon after changing the moisture content. This effect can thus be detrimental for a board or corrugated fiberboard box.

In the article "Moisture sorption Isotherms for Paper and paperboard in Food Chain Conditions" (M. E Parker et al, Packag. Technol. Sci. 2006; 19: 193-209) the moisture sorption properties of paper based materials in high humidity conditions is discussed.

Normally the problem with compression strength reduction at various relative humidity's (RH) has been solved by increasing the grammage of the fluting or liner thus creating an increased compression strength of the box. This however leads to increased cost of the end product.

There is thus a need for a board or corrugated fiberboard having increased compression strength, in particular in so called cyclic moisture humidity conditions, which board is both easy and cheap to produce. There is also a need for a board that can withstand the impact of high moisture over a longer period of time.

SUMMARY

It is an object of the present disclosure, to provide an improved corrugated fiberboard, which eliminates or alleviates at least some of the disadvantages of the prior art boards in particular during high moisture or relative humidity conditions.

More specific objects include providing a corrugated fiberboard having increased compression strength during such conditions.

The invention is defined by the appended independent claims. Embodiments are set forth in the appended dependent claims and in the following description.

According to a first aspect, there is provided a corrugated fiberboard, comprising cellulosic fibers, wherein said corrugated fiberboard has at least one of a geometrical tensile index in the range of from 32 to 65 Nm/g, a fracture toughness index in the range of from 14 to 24 Jm/kg, and a ring crush index in the range of from 5 to 10 Nm/g measured at relative humidity of 85% RH, wherein the cellulosic fibers comprises a mixture of less refined fibers having a Schopper-Riegler (SR) value in the range of 15 to 28 and microfibrillated cellulose fibers, wherein the mixture comprises said microfibrillated cellulose in a range of from 1% to 5% by weight of the dry content of the cellulosic fibers.

Paperboard is usually classified into three different categories, cartonboards, containerboards and specialty boards. Often the paperboard is a multiply product, but it may also be a single ply product. Corrugating medium or corrugated fiberboard belongs to the group of containerboards, and is usually a single ply board (Papermaking Science and Technology book 18, "Paper and Board Grades"). Corrugated fiberboard is a paper-based material consisting of a fluted corrugated sheet and one or two flat linerboards. It is made on "flute lamination machines" or "corrugators" and is used in the manufacture of shipping containers and corrugated boxes.

This means that the corrugated fiberboard has a high tensile stiffness, high fracture toughness and a good ring crush at a high relative humidity, this allows for a corrugated fiberboard which does not easily break during compression, i.e. has good resistance and structural stability, even at a high relative humidity. The ring crush is an important parameter for the liner or fluting of a corrugated fiberboard.

This means that the corrugated fiberboard may be made from a mixture of less refined fibers, i.e. fibers having a relatively low SR value, in the base pulp and an addition of microfibrillated cellulose to form a furnish, giving the corrugated fiberboard the excellent resistance and structural stability even at a high relative humidity, such as 85% RH. The corrugated fiberboard has an improved ability to be able to withstand penetration of water at high humidity and the effect of a possible water penetration.

By less refined cellulose fibers is meant that the cellulosic fibers in the base pulp have been refined to a lesser extent than in a base pulp conventionally used for manufacturing paperboard or corrugated paper board.

The less refined fibers have a Schopper-Riegler (SR) value in the range of 15 to 28.

The furnish preferably comprises less refined fibers in an amount of 95-99% by weight of the dry content of the cellulosic fibers, i.e. the furnish only comprise a mixture of less refined fibers and microfibrillated cellulose. It is thus possible to reduce the refining of the entire base pulp and be able to produce a product with improved properties at high humidity.

The corrugated fiberboard may comprise a hydrophobic sizing additive.

The addition of a hydrophobic sizing additive in the wet end of a paper and board making process provides the corrugated fiberboard with improved or less compression creep, even at a high relative humidity, such as 85% RH, and in particular in instances where corrugated fiberboard is subjected to cyclic humidity variations such as for instance low-high-low humidity. The hydrophobic sizing additive may thus slow down any moisture variations in for instance a box made from a corrugated fiberboard.

The hydrophobic sizing additive may be any one of alkylketene dimer (AKD), succinic anhydrides (ASA), rosin sizes, styrene maleic anhydride (SMA), or other emulsions, modifications or mixtures thereof.

The hydrophobic sizing additive is thus such that it may be recycled/re-pulped in the broke. A controlled hydrophobic sizing of the corrugated fiberboard may allow for a slower moisture penetration, or a reduced moisture gradient speed, into the corrugated fiberboard at the high relative humidity and when the relative humidity drops again the compression strength of the board is increased. Sizing the corrugated fiberboard with for instance AKD thus reduces the compression creep, especially at high cyclic moisture variations, i.e. when the moisture level changes from low to high to low.

The combination of mixing less refined cellulose fibers with MFC and adding a hydrophobic sizing additive, such as for instance AKD, to the paperboard or corrugated fiberboard even further improves the resistance and structural stability, i.e. gives a synergistic positive effect on the compression strength and the compression creep of the corrugated fiberboard even at a high relative humidity such as 85% RH.

The corrugated fiberboard may have a basis weight or grammage in the range of 250 to 450 g/m$^2$, and a thickness in the range of 400 to 500 μm.

The corrugated fiberboard according to the first aspect may have fraction toughness measured as Jm/kg at 85% RH in the range of 5 to 12% higher than compared to a conventional corrugated fiberboard.

By conventional corrugated fiberboard is meant a board made from fibers having a conventional degree of refining as compared to the inventive board.

According to a second aspect there is provided a method of manufacturing a corrugated fiberboard comprising cellulosic fibers, wherein the corrugated fiberboard has at least one of a geometrical tensile index in the range of from 32 to 65 Nm/g, a fracture toughness index in the range of from 14 to 24 Jm/kg, and a ring crush index in the range of from 5 to 10 Nm/g measured at relative humidity of 85% RH, and wherein the corrugated fiberboard is produced from a base pulp, wherein the base pulp comprises less refined cellulosic fibers having a Schopper-Riegler value in the range of 15 to 28, and wherein said method comprises the step of providing a furnish comprising said base pulp; adding a microfibrillated cellulose solution to said furnish, wherein the content of the microfibrillated cellulose is in the range of 1% to 5% by weight of the dry content of the cellulosic fibers.

By less refined cellulose fibers is meant that the cellulosic fibers in the base pulp have been refined to a lesser extent than in a base pulp conventionally used for manufacturing corrugated paper board. This means that the base pulp refining level is lowered from what is conventionally seen as optimum for producing corrugated fiberboards.

By this method it is thus possible to manufacture a corrugated fiberboard having improved structural characteristics even subjected to moisture conditions.

The method may further comprise a step of surface sizing said corrugated fiberboard, wherein a hydrophobic surface sizing additive is added in said surface sizing step.

The internal or hydrophobic sizing additive used in the surface sizing step may be any one of alkylketene dimer (AKD), alkenyl succinic anhydrides (ASA), rosin sizes, styrene maleic anhydride (SMA), and emulsions, modifications or mixtures thereof. The hydrophobic sizes (AKD, ASA, etc) can be added to both wet end and via a surface treatment (surface sizing) step. In a surface sizing, the varieties of hydrophobic chemicals that can be used are usually larger.

Either one of fluting and liner, or both fluting and liner of the corrugated fiberboard may be manufactured from said furnish.

It is also possible to provide a corrugated fiberboard having a layered structure where the furnish may be used for all or different layers.

The base pulp may comprise any one of a virgin and recycled pulp. When a virgin pulp is used the Schopper-Riegler (SR) value of the less refined fibers is preferably below 25. For a recycled pulp there is a usually a contribution of fines in the pulp which gives the base pulp a higher SR value than a virgin pulp, the main proportion of the pulp should preferably comprise less refined cellulose fibers than used in conventional paperboard or corrugated fiberboard manufacturing processes.

The base pulp may comprise any one of a chemical pulp, mechanical pulp, thermomechanical pulp and chemi-thermomechanical pulp.

According to a third aspect there is provided a corrugated fiberboard, comprising cellulosic fibers obtained by the method according to the second aspect, having at least one of a geometrical tensile index in the range of from 32 to 65 Nm/g, a fracture toughness index in the range of from 14 to 24 Jm/kg, and a ring crush index in the range of from 5 to 10 Nm/g measured at relative humidity of 85% RH, wherein said cellulosic fibers comprises a mixture of less refined fibers and microfibrillated cellulose.

The corrugated fiberboard as claimed may have a fraction toughness measured as Jm/kg at 85% RH which is in the range of 5 to 12% higher than compared to a conventional corrugated fiberboard.

According to a fourth aspect there is provided the use of corrugated fiberboard according to the first or third aspect for manufacturing any one of a box, a tray, a packaging.

BRIEF DESCRIPTION OF THE DRAWINGS

Examples of the present invention will be described, with reference to the accompanying drawing.

FIG. 1 Diagram showing a schematic transient change in the elastic modulus as a function of time following a moisture change.

DESCRIPTION OF EMBODIMENTS

According to the invention a corrugated fiberboard, i.e. comprising fluting and liner, is manufactured from a base pulp comprising cellulosic fibers. The corrugated fiberboard may be manufactured in any conventional paper or board making process and machine, known to the skilled person. In the description the term "board" will be used to encompass corrugated fiberboard, where nothing else is indicated. The corrugated fiberboard may comprise a layered structure.

The base pulp may be any one of a chemical pulp, mechanical pulp, thermomechanical pulp and chemi-thermomechanical pulp (CTMP), and neutral sulphite semi-chemical (NSSC) pulp.

The base pulp may further be any one of a virgin and a re-cycled pulp.

The base pulp comprises cellulosic fibers which have been less refined than conventional fibers for use in board applications. By less refined is meant that the cellulosic fibers in the base pulp are coarser than the fibers conventionally used for these types of applications. The refining of the fibers may be reduced by around 20% compared to the conventional refining for board applications. By less refined fibers is meant that they are more undamaged and may be coarser than conventionally used fibers.

The Schopper-Riegler value is dependent on the type of base pulp used for the manufacture of the board, and is usually in the range of 15 to 35, preferably between 15-28. The SR value may also be influenced by different types of chemicals, the temperature and pH.

For a virgin pulp the SR value preferably is in the range of from 15 to 25.

For a re-cycled pulp the SR value may be slightly higher than for a virgin pulp due to the occurrence of fines in the re-cycles water etc. This means that for a re-cycled pulp the SR value may rather be in the range of 20 to 35, preferably between 20-28.

The base pulp is used to form a furnish for the manufacture of the corrugated fiberboard.

Microfibrillated cellulose (MFC) is added to the furnish, in a range of range of 1% to 5% by weight of the dry content of the cellulosic fibers in the furnish, or is dosed at a range of 15-50 kg/t base pulp.

The microfibrillated cellulose is microfibrillated cellulose produced from mechanical, thermomechanical or chemical pulp. The microfibrillated cellulose is preferably produced from kraft pulp. The microfibrillated cellulose preferably has a Schopper-Riegler value (SR°) of more than 93. According to another embodiment the MFC may have a Schopper-Riegler value (SR°) of more than 95. The Schopper-Riegler value can be obtained through the standard method defined in EN ISO 5267-1. This high SR value is determined for a pulp, with or without additional chemicals, thus the fibers have not consolidated into a film or started e.g. hornification. It has been found that the use a MFC with a very high SR value, i.e. value above 93, in combination with less refined pulp has strongly improved the mentioned properties for a corrugated fiberboard.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions, having a high aspect ratio with width of 5-30 nm and aspect ratio usually greater than 50.

The furnish may further comprise other types of additives. Starch may for instance be used to enhance strength properties, but at high moisture contents starch absorb moisture and large part of the strength gained is lost. In case of MFC the moisture absorption is much less, and thus strength is not lost as much. Surprisingly this is even more so with compression strength. Fillers may also be added, but are usually not used in board grades, and if so only to top ply to control opacity and brightness of the board.

The corrugated fiberboard may then in its entirety be formed from said furnish, or different layers of the board may be formed from the furnish and combined with layers of different compositions.

For the corrugated fiberboard either the fluting or the liner may be manufactured from the furnish comprising MFC. The fluting may also be made from a different type of base pulp than the liner.

The largest effect for the compression strength is the layer which has the highest grammage, which is typically the middle ply or the in second ply, however MFC could be included into any layer of the corrugated fiberboard.

The compression strength of a material can for instance be measured by a technique known as short-span compressive test (SCT). This test is widely used by board manufacturers to control the paper raw material. There are a number of standards, known to the skilled person and manufacturers of board that describe the SCT method.

The corrugated fiberboard formed by mixing less refined cellulosic fibers in the base pulp with MFC in the furnish, has at least one of the following characteristics measured at a relative humidity of 85%, a geometrical tensile index in the range of from 32 to 65 Nm/g, a fracture toughness index in the range of from 14 to 24 Jm/kg, and a ring crush index in the range of from 5 to 10 Nm/g. The fracture toughness index is preferably between 16-24 Jm/kg. Tensile index is measured according to SCAN-P 67 and the geometrical tensile index is then calculated based on the tensile index in the cross-machine direction (CD) and the tensile index in the machine direction (MC) according to $(MD \times CD)^{1/2}$. Fracture toughness index is measured according to SCAN-P 77. The ring crush index is measured according to ISO 5270.

By at least one of is meant that the corrugated paperboard may exhibit just one, two or all three of these characteristics, depending on the structure of the board. This means that the compression strength of the board, is significantly higher than for a conventional corrugated fiberboard at increased moisture levels.

The board may further be surface sized in a surface sizing said step in for instance in a wet end process in the paper or board making machine.

The surface sizing may be performed in any conventional type of surface sizing equipment, known to the skilled person.

A hydrophobic or internal surface sizing additive or agent may be used.

The hydrophobic or internal sizing additive or agent may be any one of alkylketene dimer (AKD), alkenyl succinic anhydrides (ASA), rosin sizes, AKD. The surface sizing additive or agent may also be other types of sizing chemicals such as polymeric sizes like styrene maleic anhydride (SMA), or other emulsions. These examples also include modification or mixtures of the agents.

In a size press agents such as SMA (styrene-maleic anhydride copolymer derivatives), SA (anionic and cationic styrene acrylic copolymer, styrene acrylate copolymer, styrene-acrylate copolymer derivatives), PU (anionic and cationic polyurethanes) etc and all wet end hydrophobic chemicals may be added.

The MFC may improve the retention and distribution of the sizing chemicals, and AKD and MFC may for instance be added at the same time. In addition to this they may be mixed together, for an improved simultaneous dosage.

Waxes may be added to protect the corrugated fiberboard from high moisture environment.

The board may have a basis weight or gram mage in the range of 250 to 450 g/m².

The thickness of the board may be in the range of 400 to 500 μm.

The fraction toughness of the board measured as Jm/kg at 85% RH may be in the range of 5 to 12% higher than the fraction toughness of a conventional corrugated fiberboard. This means that the compression strength and the ability of the board to maintain its structure when subjected to pressure or loads, even at high humidity or in moist conditions, is significantly increased compared to conventionally manufactured corrugated fiberboards. The increased compression strength, and reduced compression creep of the board, is advantageous in applications where the board is used in conditions where the humidity changes. One such application is for instance boxes or packaging for fruit and vegetables, where the box is subjected not only to high moisture environments, but also to temperature variations. Other applications of the board material may be for manufacture (pressing) of trays.

Example 1

This trial was carried out on a pilot paper machine. The pulp mix comprised 70% wet hardwood and 30% dry softwood pulp. Refining at pH 7-8, and the Schopper-Riegler (SR) values were, after refining, 23-25 for both pulp qualities. The machine speed was 28 m/min. The pilot paper machine produced a moldable board. The board was stored at 85% moisture content before moldable products were produced, and this example thus refers to high moisture behavior.

The grammage of the fiberboard was 330 g/m², and the target thickness 450 μm.

Fixed chemicals added were a wet strength agent 1 kg/t (leveling box 1), starch 2 kg/t (leveling box 3) and AKD 1.5 kg/t (suction side of the fan pump). The SR values were determined using the ISO 5267/1 standard.

The effect of the addition of MFC in the pulp is shown in Table 1. There is a significant increase in the geometrical tensile index and the fracture toughness of the paperboard comprising MFC at both 50% and 85% relative humidity (RH). The tensile index, stretch at break and the tensile stiffness index was measured according to SCAN-P 67. The geometrical tensile index was calculated from the value in cross-machine direction and machine direction according to $(MD \times CD)^{1/2}$. The fracture toughness index was measured according to SCAN-P 77.

TABLE 1

Effect of addition of MFC in the pulp

|  | Without MFC 50% RH | Without MFC 85% RH | With 25 kg/t MFC 50% RH | With 25 kg/t MFC 85% RH |
|---|---|---|---|---|
| Tensile index (geo) Nm/g | 57.3 | 36.4 | 59.1 (+3%) | 39 (+7%) |
| Stretch at break % | — | 4.0 | — | 4.1 |
| Tensile stiffness index kNm/g | — | 4.1 | — | 4.6 |
| Fracture toughness index Jm/kg | 15.1 | 15.8 | 15.6 (+3%) | 17.2 (+9%) |

Example 2

A pilot paper machine trial with unbleached kraft pulp having a kappa value about 72 was performed, where a liner board was produced (simulation for top ply for corrugated board) and typical wet end chemicals used in liner board was used (AKD+oven treated, AKD amount 0.02 kg/t). The ring crush of a conventionally refined virgin fiber having an SR value of 32, with less refined virgin fiber having an SR value of 20, with a 2% addition of MFC were compared with each other. The effect on the ring crush at the higher (85%) relative humidity is shown in Table 2, where the ring crush value, in particular after a 48 h stabilization time, is significantly higher than for the paperboard comprising the conventionally refined fibers. The ring crush was measured according to ISO 5270.

TABLE 2

Effect on ring crush with less refined fibers and MFC

| Pulp refined | Ring crush 50% RH | Ring crush 85% RH 2 h stabilization time | Ring crush 85% RH, 48 h stabilization time |
|---|---|---|---|
| 32 SR value | 0.53 kN/m | 0.33 kN/m | 0.32 kN/m |
| 20 SR value + 2% MFC | 0.54 kN/m | 0.39 kN/m | 0.40 kN/m |

Example 3

A moldable product forming trial was made using the pulp of Example 2 and adding 25 kg/t base pulp of microfibrillated cellulose (MFC). The pilot paper machine produced a moldable board and the board was stored at 85% moisture content before moldable products were produced. The moldable product formed exhibited fewer cracks and imperfections that conventionally formed moldable products (without MFC addition, and higher refining). The results are shown in Table 3.

TABLE 3

| | Perfect moldable product | Minor cracks |
|---|---|---|
| Without MFC addition | 70% | 30% |
| With MFC 25 kg/t base pulp | 90% | 10% |

In view of the above detailed description of the present invention, other modifications and variations will become apparent to those skilled in the art. However, it should be apparent that such other modifications and variations may be effected without departing from the spirit and scope of the invention.

The invention claimed is:

1. A corrugated fiberboard, comprising cellulosic fibers, wherein said corrugated fiberboard has at least one of a geometrical tensile index in the range of from 32 to 65 Nm/g, a fracture toughness index in the range of from 14 to 24 Jm/kg, and a ring crush index in the range of from 5 to 10 Nm/g measured at relative humidity of 85% RH;
wherein
the cellulosic fibers comprise a mixture of fibers having a Schopper-Riegler (SR) value in the range of 15 to 28 and microfibrillated cellulose fibers, wherein the mixture comprises said microfibrillated cellulose in a range of from 1% to 5% by weight of the dry content of the cellulosic fibers, wherein the corrugated fiberboard comprises a hydrophobic sizing additive, and wherein the corrugated fiberboard comprises a fluting and a liner.

2. The corrugated fiberboard as claimed in claim 1, wherein the hydrophobic sizing additive is alkylketene dimer (AKD), succinic anhydrides (ASA), rosin sizes, or styrene maleic anhydride (SMA), or emulsions or modifications or mixtures thereof.

3. The corrugated fiberboard of claim 1, wherein the corrugated fiberboard has a basis weight in the range of 250 to 450 g/m$^2$, and a thickness in the range of 400 to 500 μm.

4. A method of manufacturing a corrugated fiberboard comprising cellulosic fibers, wherein the corrugated fiberboard comprises a fluting and a liner, wherein the corrugated fiberboard has at least one of a geometrical tensile index in the range of from 32 to 65 Nm/g, a fracture toughness index in the range of 14 to 24 Jm/kg, and a ring crush index in the range of from 5 to 10 Nm/g measured at relative humidity of 85% RH, and wherein the corrugated fiberboard is produced from a base pulp
wherein
the base pulp comprises cellulosic fibers having a Schopper-Riegler value in the range of 15 to 28,
and wherein said method comprises the steps of
providing a furnish comprising said base pulp;
adding a microfibrillated cellulose solution to said furnish, wherein the content of the microfibrillated cellulose is in the range of 1% to 5% by weight of the dry content of the cellulosic fibers; and
adding a hydrophobic sizing additive in a wet end process.

5. The method as claimed in claim 4, wherein the hydrophobic sizing additive is alkylketene dimer (AKD), succinic anhydrides (ASA), rosin sizes, or styrene maleic anhydride (SMA), or emulsions or modifications or mixtures thereof.

6. The method as claimed in claim 4, wherein either one of the fluting and the liner, or both the fluting and the liner of the corrugated fiberboard are manufactured from said furnish.

7. The method as claimed in claim 6, wherein said base pulp is a virgin pulp or a recycled pulp.

8. The method as claimed in claim 7, wherein the base pulp is a chemical pulp, mechanical pulp, thermomechanical pulp, or chemi-thermomechanical pulp.

9. A corrugated fiberboard, comprising cellulosic fibers obtained by the method of claim 4, having at least one of a geometrical tensile index in the range of from 32 to 65 Nm/g, a fracture toughness index in the range of from 14 to 24 Jm/kg, and a ring crush index in the range of from 5 to 10 Nm/g measured at relative humidity of 85% RH, wherein said cellulosic fibers comprise a mixture of fibers and microfibrillated cellulose wherein said fibers have a SR value of 15 to 28, wherein the corrugated fiberboard comprises a hydrophobic sizing additive, and wherein the corrugated fiberboard comprises a fluting and a liner.

* * * * *